United States Patent [19]

Reitzenstein

[11] 4,293,525
[45] Oct. 6, 1981

[54] APPARATUS FOR RECOVERING SULFUR FROM GASES CONTAINING HYDROGEN SULFIDE

[76] Inventor: Hermann Reitzenstein, No. 9, Amselweg, 8213 Aschau, Fed. Rep. of Germany

[21] Appl. No.: 156,453

[22] Filed: Jun. 4, 1980

[30] Foreign Application Priority Data

Nov. 30, 1978 [DE] Fed. Rep. of Germany ....... 2851802

[51] Int. Cl.$^3$ .......................... B01J 8/02; B01J 10/00; B01J 12/02
[52] U.S. Cl. .................................. 422/176; 422/177; 422/194; 422/195; 422/227
[58] Field of Search ............... 422/176, 177, 194, 195, 422/200, 227, 160; 423/222, 224, 230

[56] References Cited

U.S. PATENT DOCUMENTS

| | | | |
|---|---|---|---|
| 1,469,645 | 10/1923 | Kobbe′ ................................. | 422/195 |
| 2,808,317 | 10/1957 | Schmalenbach et al. .......... | 422/200 |
| 3,607,132 | 9/1971 | Sudduth .............................. | 422/177 |
| 3,661,534 | 5/1972 | Reed .................................... | 422/160 |
| 3,936,275 | 2/1976 | Perret et al. ........................ | 422/160 |
| 3,993,449 | 11/1976 | Childs ................................. | 422/176 |
| 4,035,158 | 7/1977 | Scott et al. ......................... | 422/160 |

*Primary Examiner*—Bradley Garris
*Attorney, Agent, or Firm*—John C. Smith, Jr.

[57] ABSTRACT

An apparatus for recovering sulfur from gases containing hydrogen sulfide by the process described in German Auslegeschrift No. 1,941,703 is provided. The apparatus is, however, suitable for processing gas mixtures containing any concentration of hydrogen sulfide met with in industry and comprises a first reaction chamber for the reaction of liquid sulfur with oxygen, nozzles installed in said chamber to give as complete mixing and circulation of the constituents as possible, and a second reaction chamber for the subsequent mixing and reaction of the sulfur dioxide formed in the first reaction chamber with the hydrogen sulfide content of the gas mixture to be treated, containing hydrogen sulfide. The two reaction chambers are connected to one another by means of orifices so that the reactions of $S_2$ with $O_2$ and of $SO_2$ with $H_2S$ take place at separate spaces and successively.

12 Claims, 3 Drawing Figures

APPARATUS FOR RECOVERING SULFUR FROM GASES CONTAINING HYDROGEN SULFIDE

BACKGROUND OF THE INVENTION

This invention relates to an apparatus for recovering sulfur from gases containing hydrogen sulfide by the process described in German Auslegeschrift No. 1,941,703, which apparatus is, however, suitable for processing gas mixtures containing any concentration of hydrogen sulfide met with in industrial processes.

When industrial gases containing more than 15 percent by volume of hydrogen sulfide are produced and are thus intended for further treatment, it has hitherto been generally customary to oxidize with atmospheric oxygen the appropriate quantity of hydrogen sulfide present in the feed gas in order to produce the quantity of sulfur dioxide required by the proportions for the recovery of sulfur. The appropriate quantity of air for combustion is precisely adjusted and continuously regulated automatically in accordance with the quantity and composition of the gas containing hydrogen sulfide. The reaction is carried out at high temperatures (approximately 1,000° C.) in an open flame in a bricklined combustion chamber. The mixing of the combustion gas with the residual gas takes place simultaneously in this combustion chamber in the absence of any operational or external action on the mixing process.

The following text summarizes the effects which take place, or are to be expected, in accordance with experience, on the overall reaction and thus on the overall yield when a sulfur recovery plant is operated in the above-mentioned manner.

As a result of the oxidation of hydrogen sulfide with air, water of combustion is formed simultaneously and in a quantity equal to that of the sulfur dioxide required for the reaction. Since the reactions leading to the formation of sulfur are reversible, the effect of increasing the proportion of water in the reaction gas mixture is to cause a shift to the left in the equilibrium in the equation: $2H_2S + SO_2 \rightleftharpoons 2H_2O + 3S$; this shift in the equilibrium is associated with a corresponding reduction in the yield of sulfur. At the same time, the substantially greater water content of the gas means a considerable increase in the dew point. In order to avoid corrosive effects caused by condensation, it is necessary to keep the operating temperatures in all sections of the plant carrying gas always at a temperature which has an adequate safety margin above the dew point temperature. The most advantageous operating temperature in the catalytic reaction of the sulfur is within a relatively low temperature range. As soon as this temperature range is exceeded, the formation of sulfur is necessarily reduced, regardless of the cause. In order to keep the yield constant, it would either be necessary to reduce the space velocity in the catalyst containers, or alternatively the throughput of the sulfur recovery plant, or to increase the quantity of catalyst.

Stemming from the raw materials, for example petroleum and coal, proportions of hydrocarbons, carbon oxysulfide and carbon disulfide, which in most cases also vary in quantity and composition, are present in the mixed gases containing hydrogen sulfide, which are obtained from desulfurization plants for further processing in sulfur recovery plants. The effect of the non-catalytic high temperature—combustion at about 1,000° C. to 1,300° C.—is to promote, in the combustion chamber, not only the dissociation into its elements of hydrogen sulfide, but also, in particular, that of the hydrocarbon. The formation of $H_2O$ and $CO_2$ in conjunction with the free atmospheric oxygen is only brought about to a limited extent. The moderated and greatly retarded formation of $SO_2$ can also be explained by the high temperatures in the radiant zone of the free flame. The cracked products from the hydrocarbon combine principally with the diatomic sulfur which is present in abundant quantities in the form of vapor and is considerably superheated. Admittedly these compounds can, to a limited extent, be re-decomposed and converted into elementary sulfur in one of the down-stream catalytic reaction stages. However, this requires a very highly active catalyst and, in addition, an operating temperature which is far above the most favorable figures which have been determined for the reaction of $H_2S$ with $SO_2$. A diminution in this reaction is a fundamental factor for the overall yield and, looking further, determines the quantity of noxious material with which the environment will be polluted in a particular case.

As a result of the process, the oxidation temperature in the combustion chamber also rises if there is a greater quantity of hydrogen sulfide in the feed gas. If the combustion is carried out with air, it must in any case be expected that the formation of nitric oxide will be promoted at very high temperatures. For this reason, a detectable quantity of nitric oxide can, in some cases, be present in the reaction gas if the operating procedures which are customary according to the state of the art known at the present time are used. It is assumed that oxides of nitrogen are a possible cause of certain obstructions which are often found in the layers of catalyst after interruptions to operation. Gaseous nitric oxide, which dissolves in the liquid sulfur when the gaseous sulfur condenses in the phase of its formation, results in undesirable impurities in the end product.

Corrosive effects and blockages which are difficult to locate can be initiated in the liquid sulfur lines as the result of the formation of crystals containing nitrogen. The nitric oxide content in the exit gases which pass into the free atmosphere should be monitored precisely. The exit gas rate and the exit gas temperature are decisive factors for the quantity of sulfur which is passed in the form of gas and mist, first to the after-combustion furnace, and from there as $SO_2$ to a chimney stack. To sum up, the atmospheric nitrogen which is necessarily associated with the use of atmospheric oxygen entails, for the processes hitherto customary, the considerable disadvantages that the conditions required for the development of undesirable side reactions are provided, that the reaction gas mixture is so greatly diluted with inert constituents that the conversion and also the yield undergo an appreciable reaction, and that the losses in the exit gases caused by entrained flying particles of elementary sulfur increase in step with the ratio between the quantity of nitrogen and the total quantity of exit gas.

The facts listed in the above description and also many further unsolved problems and unexplained difficulties originate from carrying out, on an industrial scale, the existing process for recovering sulfur from gases containing hydrogen sulfide. An exact proof on the basis of operating results is not yet possible for many valuable pieces of experience in this field of work. For example, no serviceable method of determination has yet been developed for carrying out systematic sampling and satisfactory determination of the composition of the reaction gas mixture at such high combustion temperatures at the exit of the combustion chamber. In most cases the results obtained by gas analysis are much better and more favorable than the operating figures actually found. Since the reaction of hydrogen sulfide with sulfur dioxide is favored as the temperature falls, the formation of sulfur continues in the sampling container after a sample has been taken. It has been proved by tests that at temperatures between 250° C. and 350° C., the reaction only proceeds to completion on solid surfaces and best on glass, aluminum or $Al_2O_3$.

The scope of the facts available from operating experience or from tests carried out, and also of the data available from the specialized literature on the relationships and the actual course of the formation of sulfur, is relatively small.

If the process in German Auslegeschrift No. 1,941,703 is used, it is possible to eliminate completely the disadvantages and difficulties caused by the partial combustion of the hydrogen sulfide with air and, furthermore, to achieve in addition considerable advantages in the construction and in the operation of the plant by feeding in the quantity of sulfur dioxide required for carrying out the process, by means of burning sulfur with oxygen.

At present, a large number of processes and types of equipment are known for the manufacture of sulfur dioxide by burning elementary sulfur with air, oxygen or gases enriched with oxygen, especially for obtaining sulfuric acid. However, jet burners, or alternatively atomization burners or nozzle burners, of a variety of designs are used preferentially.

These types of burner, including their respective accessories for obtaining sulfur dioxide, are unsuitable in every form for a further processing step such as corresponds to the process defined in German Auslegeschrift No. 1,941,703, because the combustion of the liquid sulfur is carried out in every case in the same space in which, at the same time, the gas containing hydrogen sulfide is also added. If the hydrogen sulfide content is 15 percent by volume or less, the quantity of sulfur corresponding to the stoichiometric formation of sulfur dioxide is also reduced proportionately. The heat of combustion liberated is too low to vaporize the sulfur, which is finely atomized in the gas mixture, rapidly and sufficiently into the diatomic state. As a result, it is not possible to expect or to ensure proper and complete oxidation with the very dilute oxygen.

SUMMARY OF THE INVENTION

It is, therefore, the object of the present invention to avoid the above-mentioned disadvantages and to provide an apparatus which is suitable for converting liquid, elementary sulfur into its diatomic, vaporous state, with simultaneous formation of sulfur dioxide, and for mixing, immediately afterwards, the resulting sulfur dioxide with an industrial gas containing hydrogen sulfide in order to recover elementary sulfur as competely as possible.

To attain this object the present invention provides an apparatus for recovering sulfur from gases containing hydrogen sulfide by the process described in German Auslegeschrift No. 1,941,703, which apparatus is, however, suitable for processing gas mixtures containing any concentration of hydrogen sulfide met with in industry, said apparatus comprising a first reaction chamber for the reaction of liquid sulfur with oxygen; a number of nozzles installed in said reaction chamber to give as complete mixing and circulation of the constituents of a mixture as possible, and a second reaction chamber for the subsequent mixing and reaction of the sulfur dioxide formed in the first reaction chamber with the hydrogen sulfide content of the gas mixture to be treated, containing hydrogen sulfide, the two reaction chambers being connected to one another by means of orifices in such a way that the reactions of $S_2$ with $O_2$ and of $SO_2$ with $H_2S$ take place at separate spaces and successively.

BRIEF DESCRIPTION OF THE DRAWINGS

An embodiment of the invention will now be described by way of example and with reference to the accompanying drawings in which.

DESCRIPTION OF THE PREFERRED EMBODIMENT

Figure 1:
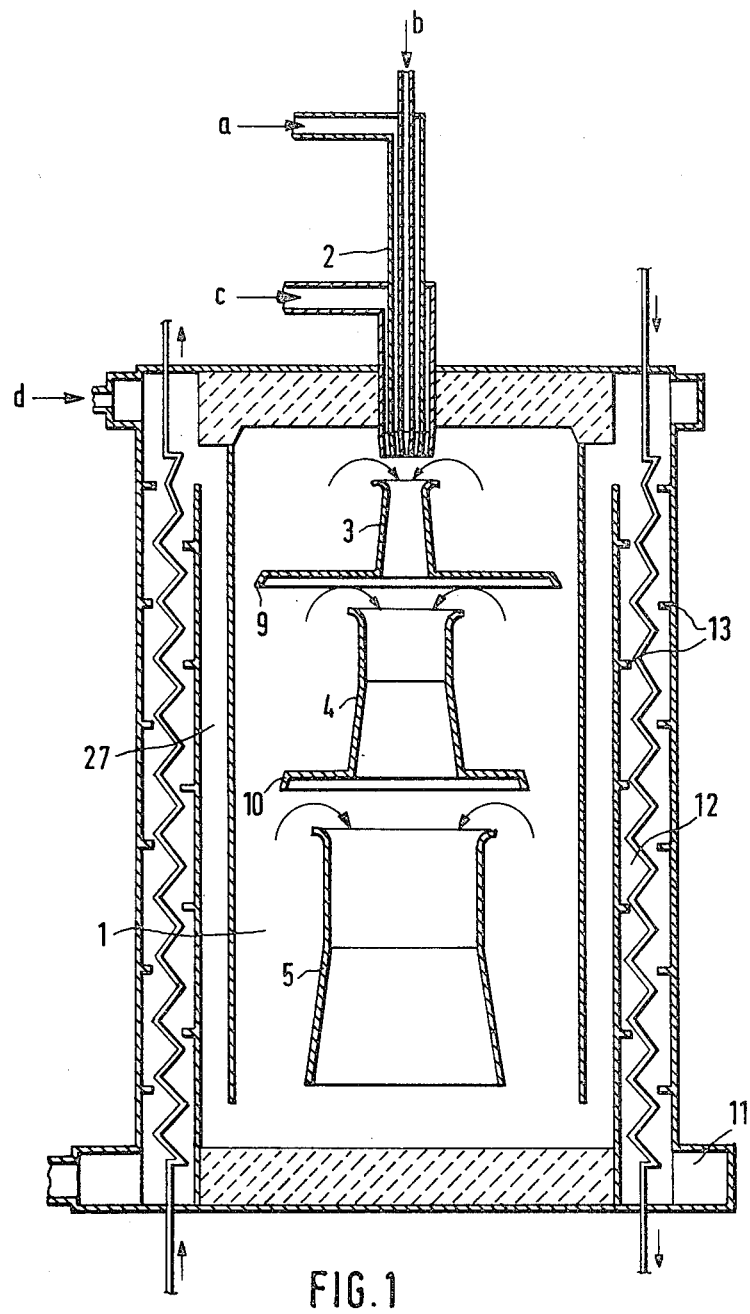
FIG. 1 shows diagrammatically the construction of the apparatus, in particular of the first reaction chamber, the mixing chamber and the second reaction chamber.

Referring now to FIG. 1 of the drawings, liquid sulfur is fed by means of a pump, not shown, through a line b to a burner 2 which is mounted on a first reaction chamber 1. The oxygen, in a stoichiometric ratio, also passes to the burner 2 via a line a and from this burner is jetted, at a sufficient supply pressure, into the first reaction chamber 1, simultaneously with the liquid sulfur. A line c is provided as a reserve line, through which, if necessary, a blanketing gas, or alternatively, an additional heating agent or cooling agent, is added. The temperature in the first reaction chamber 1 is adjusted and controlled by means of the addition of sulfur. A precise setting of the quantity of sulfur which is pumped in excess to the burner 2 and can merely vaporize, but not burn, for lack of oxygen, makes it possible to keep the operating temperature at all times within the required or desired range. In the first reaction chamber 1, the diatomic, vaporous sulfur is partially converted into sulfur dioxide by means of the particular quantity of oxygen admixed to it. Nozzles 3, 4 and 5 are inserted into the first reaction chamber 1 in order to improve the simultaneous vaporization and oxidation of the sulfur. These nozzles 3, 4 and 5 are designed as injector nozzles, are manufactured from materials resistant to high temperatures and to corrosion and are arranged one below another in the direction of flow.

Figure 2:
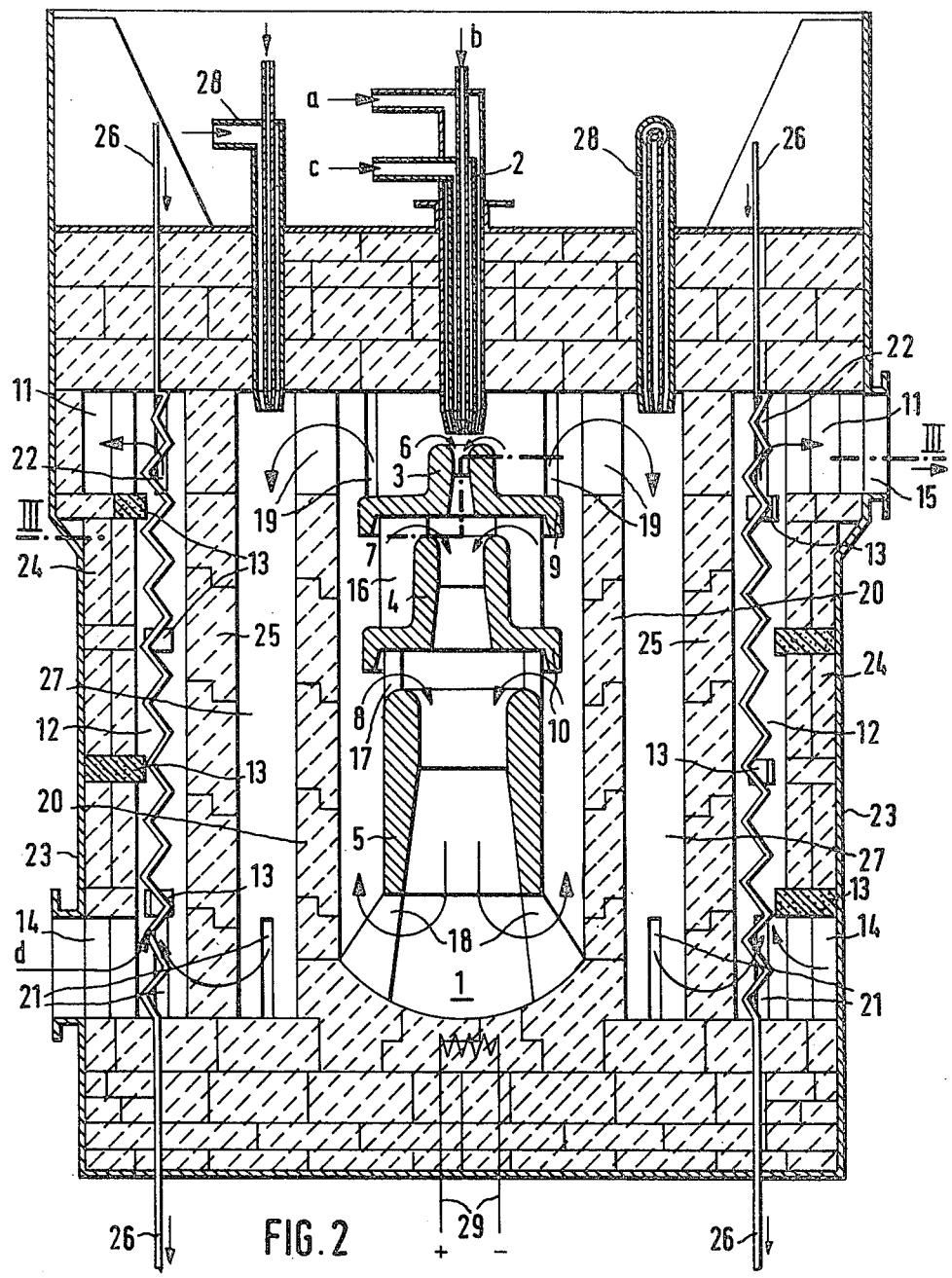
FIG. 2 shows a preferred embodiment of the apparatus according to the invention in longitudinal section.

FIG. 2 shows that supporting elements 16, 17 and 18 (FIG. 2) are located on the nozzles and are only placed loosely on top of one another, so that no kind of stress can occur in the event of expansion or shrinkage of the material, caused by temperature changes. The reactants sulfur and oxygen, which issue at a high velocity from the nozzle of the burner 2, suck in, in stages, as a result of the injector effect set up in the injector nozzles 3, 4 and 5, via the respective annular inlet cross sections 6, 7 and 8 of the said nozzles, an appropriate quantity of hot sulfur dioxide which has already been formed as a circulating gas. Annular baffles 9 and 10 are formed on the injector nozzles 3 and 4 and are designed in such a way that the annular flow cross sections formed between them and the wall of the first reaction chamber 1 become larger, proceeding upwards, in the reverse sequence of these baffles. Since the propelling action of the nozzles associated with them increases in approximately the same ratio, the build-up effect of the baffles 9 and 10 is correspondingly favored and promoted. An additional considerable advantage consists in the fact that these inserts into the first reaction chamber 1 produce a preferential, self-acting and infinitely variable adjustment to limited variations in load and alterations in operating conditions. The acceleration of heat transfer and sulfur vaporization caused by the repeated circulation of gas and also the multi-stage improvement of the mixing process and of the formation of sulfur dioxide are effects of the design according to the invention.

In order to effect the formation of sulfur under the most favorable conditions, the mixture of sulfur dioxide and vaporous sulfur, which has been formed in the first reaction chamber 1 and heated to a high temperature, flows through slit-shaped orifices 19 into an annular mixing chamber 27 which is arranged around the first reaction chamber 1, i.e. placed immediately downstream of the first reaction chamber 1.

If operating conditions make it necessary or desirable, hydrogen, methane or other solid, liquid, vaporous or gaseous substances which are suitable for exerting an effect on the process in a specific and desired direction, can additionally be passed, via a feed line 28, into this annular mixing chamber 27 arranged around the first reaction chamber 1. For reasons connected with the technology of materials, the reaction gas produced in the first reaction chamber 1 is mixed with the additives chosen in a particular case at about 1,250° C. Within this temperature range, depending on the equilibrium conditions, relatively little hydrogen sulfide is formed from the content of vaporous sulfur in the gas passing the slit-shaped orifices 19 and the hydrogen which is present in the adding gas or is formed by the cracking of methane. The reaction gas mixture, which has been adjusted to the optimum reaction and utilization conditions, then passes through slits 21 into a second reaction chamber 12, in counter-current flow. The gas mixture to be treated, containing hydrogen sulfide, is introduced into the second reaction chamber 12, also in counter-current flow, from a feedline d via a ring channel 14 and through the slits 21. A plurality of ceramic projections 13 are embedded in the refractory lining of the second reaction chamber 12 in order to give better turbulence to the reaction gas streams. The temperature at which the hot gas from the mixing chamber 27 is mixed with the cold, or, generally, in most cases extensively preheated, feed gas containing hydrogen sulfide is adjusted so that an almost complete reaction of the vaporous sulfur with the free hydrogen available to give hydrogen sulfide is possible, no account being taken initially of the purely thermal formation of sulfur from hydrogen sulfide and sulfur dioxide. However, in the formation phase of the hydrogen sulfide, not only is its readiness to form compounds with sulfur dioxide activated and accelerated, but, simultaneously, as a result of the heat of formation liberated, of an order or magnitude of 214 kcals per $Nm^3$ of $H_2$ or 150 kcals per kg of S, the temperature of the mixed gas is also raised considerably. The incorporation of filling material is advantageous for the mixing process in the second reaction chamber 12. A perceptible improvement in the progress of the reaction can be expected, in accordance with the invention, as a result of coating with catalyst material.

A tube bundle 26 for heating or cooling is fitted in order to adjust the correct operating temperature when filling the second reaction chamber 12 with catalyst material—or under special operating conditions.

Figure 3:
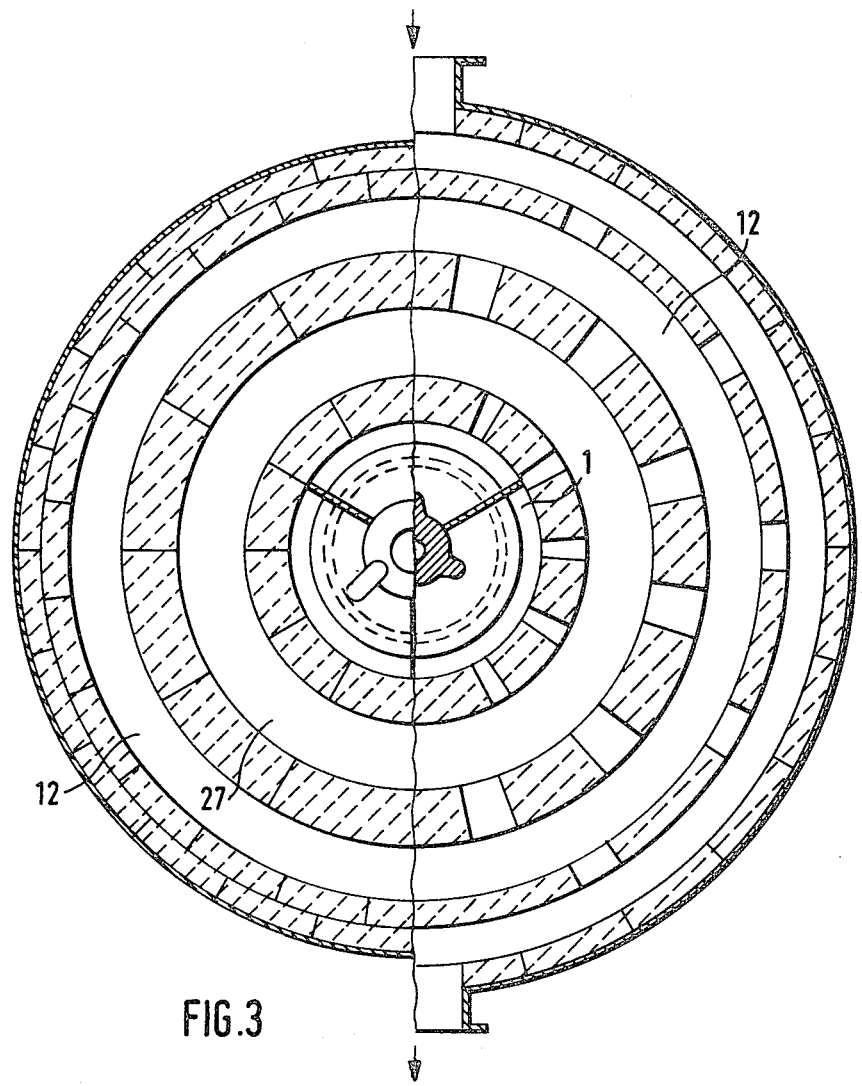
FIG. 3 shows a cross section through the apparatus on the line III—III of FIG. 2.

After passing through the second reaction chamber 12, the resulting gas mixture leaves the apparatus via exit apertures 22 and an annular exit channel 11 and through a gas exit line 15. Immediately afterwards, this exit gas is cooled in a heat exchanger in counter-current flow to the feed gas containing hydrogen sulfide. In the course of this, the vaporous sulfur entrained in the exit gas should as far as possible be condensed and separated, in order not to contaminate the catalytic reaction stage in the subsequent sulfur recovery process. The quantity of heat used for vaporizing the excess liquid sulfur in order to produce sulfur dioxide is recovered almost completely in the preheated feed gas containing hydrogen sulfide. This heat recovery, although it is not shown in FIGS. 1, 2 and 3, forms part of the advantages provided by the invention. The apparatus is enclosed in a shell element 23, which is, if appropriate, designed to resist fairly high pressures and is lined on the inside with refractory brick lining 24. The first reaction chamber 1 and the mixing chamber 27 are also constructed from refractory materials 25 and 20.

An ignition device 29, for example an incandescent ignition device, is provided in the brick-lined base of the first reaction chamber 1, in order to prevent the accumulation of liquid sulfur, and thus the formation of explosive mixtures, in the event of operating troubles.

A particular advantage of the apparatus according to the invention consists in the fact that it is also possible to process, without difficulties, gas mixtures containing hydrogen sulfide, which have less than 15 percent by volume of hydrogen sulfide. The apparatus proposed by the invention therefore makes it possible to convert the hydrogen sulfide constituent in all gases met with in industry into elementary liquid sulfur, in a controlled manner, entirely independently of the concentration. In plants according to the state of the art, the recovery of sulfur is necessarily limited by a minimum content of hydrogen sulfide in the feed gases produced in a particular case, in the absence of special measures which are associated with as yet unknown operating consequences and with additional economic disadvantages.

A further preferred characteristic, which should not be overlooked, of the apparatus according to the invention is that, mainly as a result of the considerably reduced exit gas rate, the emission of harmful substances into the environment is also considerably reduced at the same time.

The invention may be embodied in other specific forms without departing from the spirit or essential characeristics thereof. The embodiment is therefore to be considered in all respects as illustrative and not restrictive.

What is claimed is:

1. An apparatus for recovering sulfur from gases containing hydrogen sulfide, said apparatus comprising:
   (a) a first reaction chamber for the reaction of liquid sulfur with oxygen;
   (b) a plurality of nozzles installed one on top of another loosely in said first reaction chamber in the direction of flow of the materials flowing into said chamber to give as complete mixing and circulation of the constituents of a mixture as possible, slit-shaped orifices being provided between said nozzles in order to mix and circulate the reactants, and (c) a second reaction chamber for the subsequent mixing and reaction of the sulfur dioxide formed in said first reaction chamber with the hydrogen sulfide content of the gas mixture to be treated, containing hydrogen sulfide, (d) said two reaction chambers being connected to one another by means of orifices in such a way that the reactions of sulfur with oxygen and of sulfur dioxide with hydrogen sulfide take place at separate locations and successively.

2. An apparatus as set forth in claim 1, wherein two of said nozzles are provided with an annular baffle in such a way that a substantial improvement is effected in the mixing and circulation of the reactants.

3. An apparatus as set forth in claim 2, wherein the annular baffles are constructed in such a way that the annular flow cross sections formed between them and the wall of the reaction chamber become larger, proceeding upwards, in the reverse sequence of the baffles, and, as a result of the increased built-up effect, promote the propelling action of the nozzles associated with them.

4. An apparatus as set forth in claim 1, wherein projections are installed in said second reaction chamber in order to give stronger turbulence to the gas stream.

5. An apparatus as set forth in claim 1, wherein a sulfur burner and feed lines for the sulfur and for the oxygen are connected to the top of said first reaction chamber and an ignition device is installed on the bottom of said first reaction chamber.

6. An apparatus as set forth in claim 5, wherein said ignition device is an incandescent ignition device.

7. An apparatus as set forth in claim 1, wherein a tube bundle for heating and cooling is provided in said second reaction chamber.

8. An apparatus as set forth in claim 1, wherein layers of packing or layers of catalyst are incorporated in said second reaction chamber in order to improve the mixing process and the yield.

9. An apparatus for recovering sulfur from gases containing hydrogen sulfide, said apparatus comprising:
(a) a first reaction chamber for the reaction of liquid sulfur with oxygen;
(b) a plurality of nozzles installed in said first reaction chamber to give as complete mixing and circulation of the constituents of a mixture as possible; p1
(c) an annular mixing chamber surrounding said first reaction chamber;
(d) a second reaction chamber for the subsequent mixing and reaction of the sulfur dioxide formed in said first reaction chamber with the hydrogen sulfide content of the gas mixture to be treated, containing hydrogen sulfide; and
(e) slit-like orifices connecting said first reaction chamber to said mixing chamber and said mixing chamber to said second reaction chamber in such a way that counter-current flows result, leading to better mixing of the reactants;
(f) whereby the reactions of sulfur with oxygen and of sulfur dioxide with hydrogen sulfide take place at separate locations and successively.

10. An apparatus as set forth in claim 9, wherein a feed line is associated with said annular mixing chamber extending around said first reaction chamber, said feed line being arranged for passing substances, which are suitable for exerting an effect, in a specific and desired direction, on the operation and the running of the apparatus according to the invention, into said mixing chamber.

11. An apparatus for recovering sulfur from gases containing hydrogen sulfide, said apparatus comprising:
(a) a first reaction chamber for the reaction of sulfur with oxygen;
(b) a plurality of nozzles arranged serially in spaced relation in said first reaction chamber;
(c) means for directing sulfur and oxygen simultaneously in said first reaction chamber through each of said nozzles serially and in sequence to mix and circulate the reactants;
(d) a second reaction chamber for the subsequent mixing and reaction of the sulfur dioxide formed in said first reaction chamber with a hydrogen sulfide containing gas mixture; and
(e) orifice means connecting said two reaction chambers to one another,
(f) whereby the reactions of sulfur with oxygen and of sulfur dioxide with hydrogen sulfide take place at separate locations and successively.

12. An apparatus for recovering sulfur from gases containing hydrogen sulfide, said apparatus comprising:
(a) a first reaction chamber for the reaction of sulfur with oxygen;
(b) a plurality of nozzles in said first reaction chamber,
(c) an annular mixing chamber surrounding said first reaction chamber;
(d) a second reaction chamber for the subsequent mixing and reaction of the sulfur dioxide formed in said first reaction with a hydrogen sulfide containing gas mixture; and
(e) orifice means connecting said first reaction chamber to said mixing chamber and said mixing chamber to said second reaction chamber, said orifice means being arranged to provide counter-current flow;
(f) whereby reactions of sulfur with oxygen and of sulfur dioxide with hydrogen sulfide take place at separate locations and successively.

* * * * *